(12) United States Patent
Manabe

(10) Patent No.: US 10,031,017 B2
(45) Date of Patent: Jul. 24, 2018

(54) LIQUID AMOUNT DETECTING DEVICE

(71) Applicant: Aisan Kogyo Kabushiki Kaisha, Obu-shi (JP)

(72) Inventor: Yuichi Manabe, Inazawa (JP)

(73) Assignee: AISAN KOGYO KABUSHIKI KAISHA, Obu-Shi (JP)

( * ) Notice: Subject to any disclaimer, the term of this patent is extended or adjusted under 35 U.S.C. 154(b) by 154 days.

(21) Appl. No.: 14/677,141

(22) Filed: Apr. 2, 2015

(65) Prior Publication Data
US 2015/0285669 A1    Oct. 8, 2015

(30) Foreign Application Priority Data

Apr. 4, 2014 (JP) .................. 2014-078017

(51) Int. Cl.
G01F 23/38 (2006.01)
G01F 23/32 (2006.01)
G01F 22/00 (2006.01)

(52) U.S. Cl.
CPC .............. *G01F 23/38* (2013.01); *G01F 22/00* (2013.01); *G01F 23/32* (2013.01)

(58) Field of Classification Search
CPC ...................................................... G01F 23/38
See application file for complete search history.

(56) References Cited

U.S. PATENT DOCUMENTS

| 2007/0204689 A1* | 9/2007 | Bostrom ............. G01F 23/2962 73/290 V |
| 2012/0101745 A1 | 4/2012 | Kohno et al. |
| 2012/0174667 A1* | 7/2012 | Miyagawa .............. G01F 23/36 73/304 R |

FOREIGN PATENT DOCUMENTS

| JP | H05288589 A | 11/1993 |
| JP | 2000-035356 A | 2/2002 |
| JP | 2003-227742 A | 8/2003 |
| JP | 3969340 B2 | 9/2007 |
| JP | 2012-093155 A | 5/2012 |

OTHER PUBLICATIONS

Korean Office Action with English translation for Korean Patent Application No. 10-2015-0033026 dated Dec. 14, 2015 (8 pages).

* cited by examiner

*Primary Examiner* — Lisa Caputo
*Assistant Examiner* — Alex Devito
(74) *Attorney, Agent, or Firm* — Shumaker, Loop & Kendrick, LLP

(57) ABSTRACT

A liquid amount detecting device may be provided with a first detector disposed in a first storage part; a second detector disposed in a second storage part; and a connecting cable. The first detector may include: a first float; a first arm; a first magnetic sensor which generates a first analog signal corresponding to the movement of the first arm; and a first output terminal which outputs a first output voltage value corresponding to the first analog signal. The second detector may include: a second float; a second arm; a second magnetic sensor which generates a second analog signal corresponding to the movement of the second arm; a reference terminal; and a second output terminal which outputs a second output voltage value corresponding to an integrated voltage value in which a voltage value indicated by the second analog signal and the first output voltage value are integrated.

6 Claims, 9 Drawing Sheets

LIQUID AMOUNT DETECTING DEVICE

CROSS-REFERENCE TO RELATED APPLICATION

This application claims priority to Japanese Patent Application No. 2014-078017, filed on Apr. 4, 2014, the contents of which are hereby incorporated by reference into the present application.

TECHNICAL FIELD

A technique disclosed in this specification relates to a liquid amount detecting device configured to detect a total liquid amount stored in a plurality of storage parts (a device to detect a fuel amount stored in a fuel tank of an automobile, for example).

DESCRIPTION OF RELATED ART

Some liquid amount detecting devices of this kind includes a plurality of detectors arranged in a plurality of storage parts. As an example, a liquid amount detecting device disclosed in Japanese Patent Application Publication No. H5-288589 is to detect a liquid amount of fuel stored in a saddle-shaped fuel tank including a main storage part and a secondary storage part. This liquid amount detecting device includes a resistive fuel sender to detect a liquid level (e.g., liquid amount) of fuel stored in the main storage part and a resistive fuel sender to detect a liquid level (e.g., liquid amount) of fuel stored in the secondary storage part. These fuel senders and a fuel meter are connected in series. Signals from the fuel senders are to be inputted to the fuel meter.

SUMMARY

The liquid amount detecting device employing the aforementioned technique uses a resistive detector using resistance. In some cases, the resistive detector cannot detect a liquid level (e.g., liquid amount) accurately due to influence of wear of a component or a foreign matter. Thus, use of a magnetic detector using a magnetic sensor has been considered. For example, if a magnetic detector is provided in each of a plurality of storage parts, an output voltage value indicating a liquid amount in each storage part may be acquired from the corresponding detector, and a total liquid amount in each of the storage parts may be acquired based on the corresponding output voltage value. However, this feature involves a plurality of connecting cables to be used for supplying a reference voltage value from a power source to the plurality of detectors, and a plurality of connecting cables to be used for acquiring output voltage values from the plurality of detectors.

This specification provides, in a feature of detecting a total liquid amount stored in a plurality of storage parts using a plurality of magnetic sensor detectors, a liquid amount detecting device configured to be capable of curbing increase in the total number of connecting cables.

The liquid amount detecting device disclosed in the present specification may be configured to detect a total liquid amount stored in a plurality of storage parts including a first storage part and a second storage part. The liquid amount detecting device may comprise a first detector disposed in the first storage part; a second detector disposed in the second storage part; and a connecting cable for connecting the first detector and the second detector. The first detector may comprise: a first float; a first arm configured to convert a vertical movement of the first float to rotational movement; a first magnetic sensor configured to generate a first analogue signal corresponding to the rotational movement of the first arm; and a first output terminal having one end of the connecting cable connected, and configured to output a first output voltage value corresponding to a voltage value indicated by the first analogue signal. The second detector may comprise: a second float; a second arm configured to convert a vertical movement of the second float to a rotational movement; a second magnetic sensor configured to generate a second analogue signal corresponding to the rotational movement of the second arm; a reference terminal having the other end of the connecting cable connected; and a second output terminal configured to output a second output voltage value corresponding to an integrated voltage value in which a voltage value indicated by the second analogue signal and the first output voltage value inputted to the reference terminal are integrated.

According to the aforementioned structure, the first detector outputs the first output voltage value corresponding to the rotational movement of the first arm (specifically, liquid amount in the first storage part). The first output voltage value is inputted from the output terminal of the first detector to the reference terminal of the second detector through the connecting cable. The second detector outputs the second output voltage value corresponding to the integrated voltage value (specifically, total liquid amount in the first and second storage parts) in which a voltage value corresponding to the rotational movement of the second arm (specifically, liquid amount in the second storage part) and the first output voltage value are integrated. In other words, the second detector can output the second output voltage value corresponding to the total liquid amount in the first and second storage parts while assuming the first output voltage value output from the first detector as a reference voltage value. In this way, according to the aforementioned feature, the connecting cable through which the first output voltage value is to be outputted from the first detector functions as a connecting cable through which the reference voltage value is to be inputted to the second detector. As a result, increase in the total number of connecting cables can be curbed.

DETAILED DESCRIPTION

Figure 1:
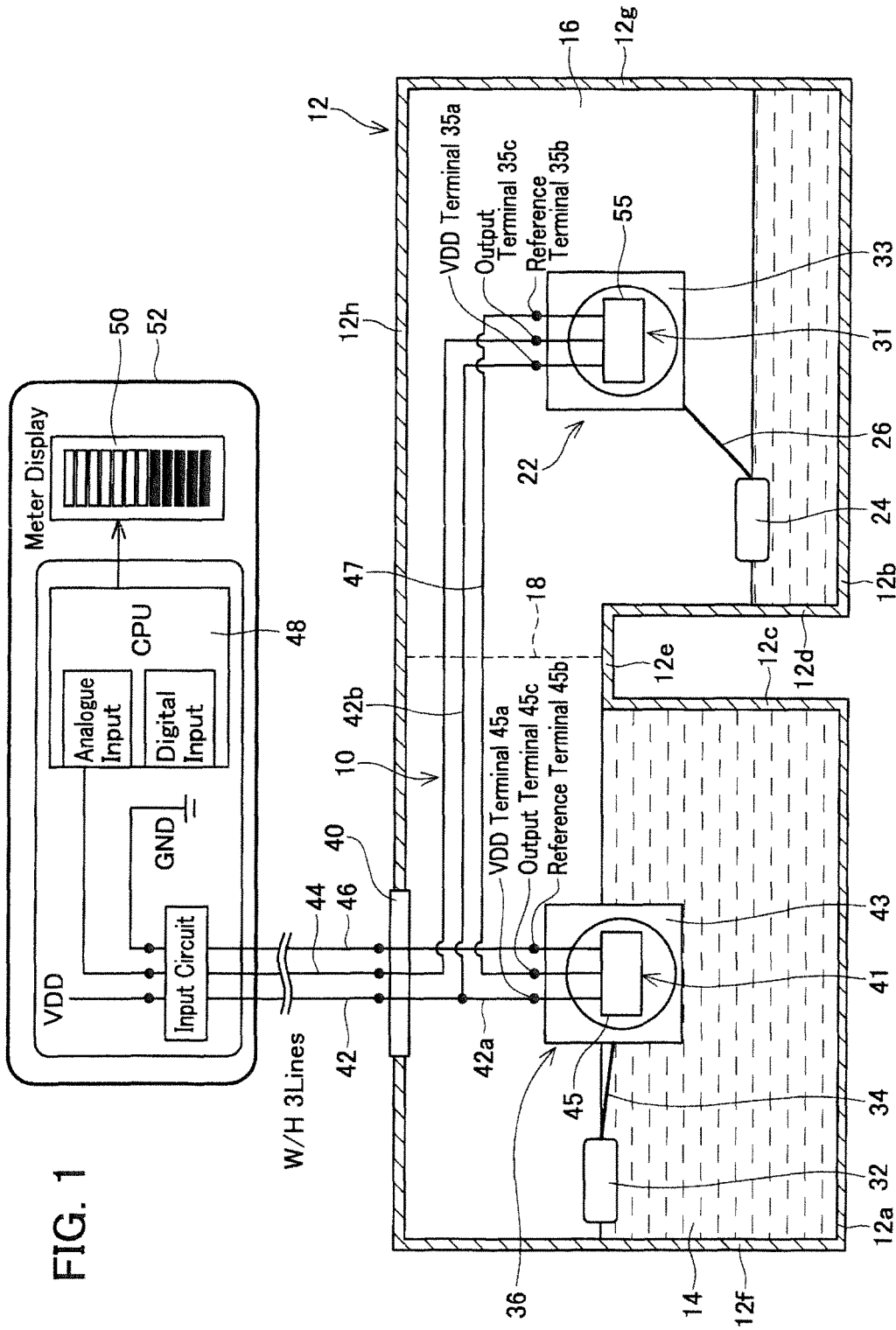
FIG. 1 shows a feature of a fuel amount detecting device.

Some characteristics of embodiments described below are listed first. All the characteristics listed below are effective independently.

The liquid amount detecting device may be configured to: output a minimum voltage value in a case where the total liquid amount stored in the plurality of storage parts is a minimum value; and output a maximum voltage value in a case where the total liquid amount stored in the plurality of storage parts is a maximum value. A maximum value of the first output voltage value may be a value determined in accordance with the minimum voltage value, the maximum voltage value, and a predetermined liquid amount ratio. The predetermined liquid amount ratio may be a ratio of a liquid amount which the first storage part is capable of storing and the total liquid amount which the plurality of storage parts is capable of storing. This feature allows the first detector to output the proper first output voltage value.

The first storage part and the second storage part may be arranged in a same vessel. The vessel may comprise: a first plate-shaped part having a dimension along a horizontal plane and defining a bottom surface of the first storage part; a second plate-shaped part having a dimension along the horizontal plane and defining a bottom surface of the second storage part; a first sidewall part extending upward from the first plate-shaped part and defining a side surface of the first storage part; a second sidewall part extending upward from the second plate-shaped part and defining a side surface of the second storage part; and a third plate-shaped part having a dimension along the horizontal plane and continuing to an upper end of the first sidewall part and an upper side of the second sidewall part. This feature allows the liquid amount detecting device to detect a liquid amount properly if the vessel where the first and second storage parts are arranged is what is called a saddle-shaped tank.

A liquid amount which the first storage part is capable of storing may be equal to a liquid amount which the second storage part is capable of storing. A height of the first sidewall part may be equal to a height of the second sidewall part.

The second detector further may comprise a correction circuit configured to correct the integrated voltage value so as to output the second output voltage value that is proportional to a total liquid amount stored in the first storage part and the second storage part. According to this feature, the liquid amount detecting device can properly output the second output voltage value proportional to the total liquid amount stored in the first and second storage parts. Additionally, an apparatus external to the liquid amount detecting device becomes free from the necessity of correcting the integrated voltage value.

Representative, non-limiting examples of the present invention will now be described in further detail with reference to the attached drawings. This detailed description is merely intended to teach a person of skill in the art further details for practicing preferred aspects of the present teachings and is not intended to limit the scope of the invention. Furthermore, each of the additional features and teachings disclosed below may be utilized separately or in conjunction with other features and teachings to provide improved liquid amount detecting devices, sensor devices, as well as methods for using and manufacturing the same.

Moreover, combinations of features and steps disclosed in the following detailed description may not be necessary to practice the invention in the broadest sense, and are instead taught merely to particularly describe representative examples of the invention. Furthermore, various features of the above-described and below-described representative examples, as well as the various independent and dependent claims, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter.

First Embodiment

Figure 2:
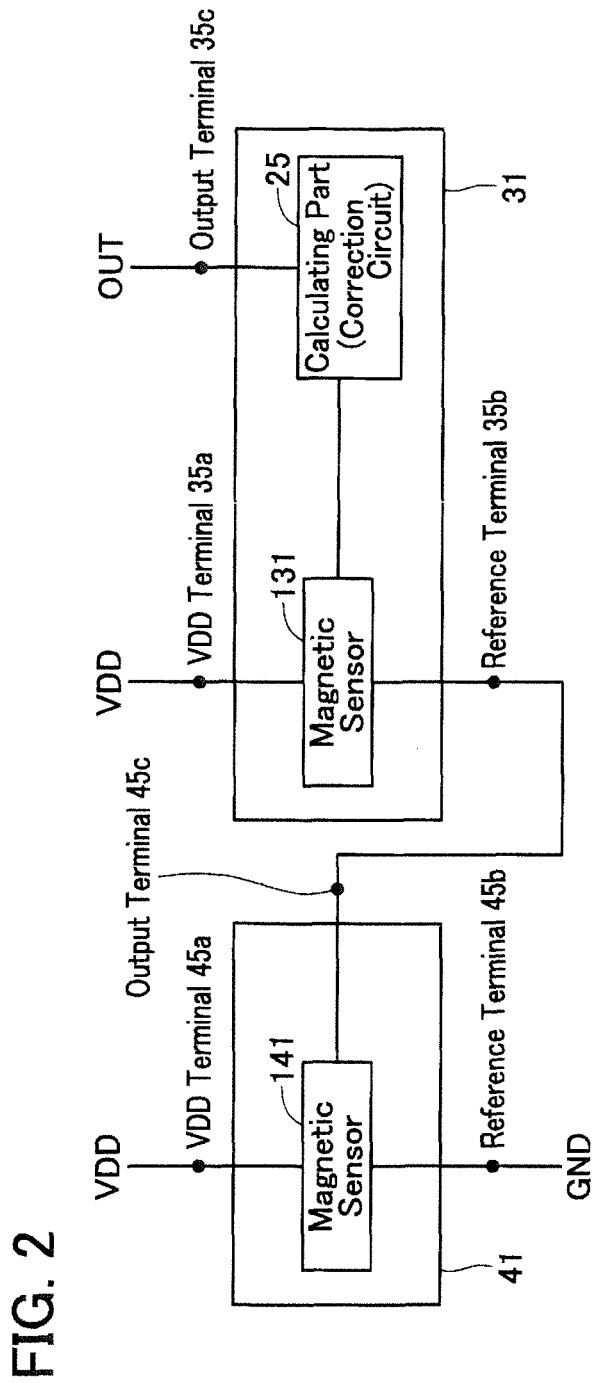
FIG. 2 shows a circuit feature of the fuel amount detecting device.

As shown in FIG. 1, a fuel amount detecting device 10 is arranged in a saddle-shaped fuel tank 12 installed on an automobile. As shown in FIGS. 1 and 2, the fuel amount detecting device 10 comprises a first fuel amount detector 36, a second fuel amount detector 22, and a connecting cable 47 for connecting the first and second fuel amount detectors 36 and 22.

The fuel tank 12 is described first. The fuel tank 12 comprises a first plate-shaped part 12a, a second plate-shaped part 12b, a first sidewall part 12c, a second sidewall part 12d, a third plate-shaped part 12e, a third sidewall part 12f, a fourth sidewall part 12g, and a fourth plate-shaped part 12h. While an automobile is placed on a horizontal plane, the first and second plate-shaped parts 12a and 12b each have a dimension along the horizontal plane. Each of the first and second plate-shaped parts 12a and 12b may be curved or bent at least partially. The first and second plate-shaped parts 12a and 12b are spaced apart from each other and are arranged at the same height.

The first sidewall part 12c is arranged at a side edge of the first plate-shaped part 12a near the second plate-shaped part 12b. The first sidewall part 12c has a flat-plate shape and extends upward from the first plate-shaped part 12a. The second sidewall part 12d is arranged at a side edge of the second plate-shaped part 12b near the first plate-shaped part 12a. The second sidewall part 12d has a flat-plate shape and extends upward from the second plate-shaped part 12b. Each of the sidewall parts 12c and 12d may be curved or bent at least partially.

The upper ends of the first and second sidewall parts 12c and 12d are continued through the third plate-shaped part 12e. The third plate-shaped part 12e has a dimension along the horizontal plane. The third plate-shaped part 12e may be curved or bent at least partially. A bottom wall of the fuel tank 12 is formed by the first and second sidewall parts 12c and 12d, and the third plate-shaped part 12e. In the below, a tank having the first and second plate-shaped parts 12a and 12b, the first and second sidewall parts 12c and 12d, and the third plate-shaped part 12e is called a saddle-shaped tank. The saddle-shaped tank has space defined between two storage parts 14 and 16 (in this embodiment, space defined by the first and second sidewall parts 12c and 12d and the third plate-shaped part 12e). This space is used for installation of a member such as a propeller shaft.

The third sidewall part 12f extends upward from the first plate-shaped part 12a. The fourth sidewall part 12g extends upward from the second plate-shaped part 12b. The upper ends of the third and fourth sidewall parts 12f and 12g are continued through the fourth plate-shaped part 12h. While the automobile is placed on the horizontal plane, the fourth plate-shaped part 12h has a dimension along the horizontal plane. In the fuel tank 12, the two storage parts 14 and 16 are formed by all the aforementioned parts 12a to 12h. In other words, space inside the fuel tank 12 is divided into the first and second storage parts 14 and 16.

The first storage part 14 is located above the entire first plate-shaped part 12a and above a half of the area of the third plate-shaped part 12e near the first plate-shaped part 12a. The second storage part 16 is located above the entire second plate-shaped part 12b and above a half of the area of the third plate-shaped part 12e near the second plate-shaped part 12b. The first and second storage parts 14 and 16 contact each other above the third plate-shaped part 12e. FIG. 1 shows a virtual boundary 18 between the first and second storage parts 14 and 16. Specifically, the first plate-shaped part 12a defines a bottom surface of the first storage part 14. The second plate-shaped part 12b defines a bottom surface of the second storage part 16. The first sidewall part 12c defines a side surface of the first storage part 14. The second sidewall part 12d defines a side surface of the second storage part 16.

The first storage part 14 is space defined by the first plate-shaped part 12a, the first sidewall part 12c, a portion of the third plate-shaped part 12e, the third sidewall part 12f, a portion of the fourth plate-shaped part 12h facing the first plate-shaped part 12a and the aforementioned portion of the third plate-shaped part 12e, and the boundary 18. The second storage part 16 is space defined by the second plate-shaped part 12b, the second sidewall part 12d, a remaining portion of the third plate-shaped part 12e, the fourth sidewall part 12g, a portion of the fourth plate-shaped part 12h facing the second plate-shaped part 12b and the aforementioned remaining portion of the third plate-shaped part 12e, and the boundary 18. In this embodiment, the first and second storage parts 14 and 16 have the same capacity. Thus, a fuel amount that can be stored in the first storage part 14 is equal to a fuel amount that can be stored in the second storage part 16.

A fuel pump not shown in the drawings is arranged in the first storage part 14 in the fuel tank 12. The fuel pump sucks fuel in the fuel tank 12 (specifically, in the first storage part 14) and places the fuel in increased pressure, and supplies the fuel in increased pressure to the outside of the fuel tank 12 (specifically, to an engine). While the fuel pump is arranged in the first storage part 14, fuel in the second storage part 16 should be transferred to the first storage part 14 in response to drop of the liquid level of the fuel in the fuel tank 12. The fuel is transferred from the second storage part 16 to the first storage part 14 by acceleration and deceleration during traveling or centrifugal force generated during rotation, or by using a jet pump (not shown in the drawings) using part of fuel discharged from the fuel pump.

The first fuel amount detector 36 is arranged in the first storage part 14. The first fuel amount detector 36 comprises a float 32, an arm 34 fixed to the float 32, a rotor 45 fixed to a base end of the arm 34, a magnetic sensor unit 41 to detect the rotation angle of the rotor 45, a VDD terminal 45a for connection to a power source, a reference terminal 45b for connection to the ground, and an output terminal 45c for output of a voltage. The float 32 floats in fuel in the first storage part 14 and moves vertically in response to the liquid level of the fuel. A tip of the arm 34 is fixed to the float 32. The rotor 45 is fixed to the base end of the arm 34. The rotor 45 is for example formed of a permanent magnet. The rotor 45 is to generate a given magnetic field. The rotor 45 is rotatably supported by a casing 43. The magnetic sensor unit 41 is arranged in the casing 43. The magnetic sensor unit 41 detects the magnetic field generated by the rotor 45. Thus, if the float 32 moves vertically in response to the liquid level of the fuel in the first storage part 14, the arm 34 swings to rotate the rotor 45 in a swinging motion relative to the casing 43. The rotation of the rotor 45 changes the direction of the magnetic field generated by the rotor 45. This changes the direction or intensity of the magnetic field of the rotor 45 detected by a magnetic sensor 141 (see FIG. 2) in the magnetic sensor unit 41. The magnetic sensor 141 outputs an analog signal corresponding to a fuel amount stored in the first storage part 14 based on the detected direction or intensity of the magnetic field of the rotor 45. The magnetic sensor unit 41 is described in detail later.

The second fuel amount detector 22 has the same feature as the first fuel amount detector 36. The second fuel amount detector 22 comprises a float 24, an arm 26, a rotor 55, a magnetic sensor unit 31, a VDD terminal 35a, a reference terminal 35b, and an output terminal 35c. If the float 24 moves vertically in response to the liquid level of fuel in the second storage part 16, the arm 26 swings to rotate the rotor 55 relative to a casing 33. A magnetic sensor 131 (see FIG. 2) of the magnetic sensor unit 31 detects the rotational movement of the rotor 55 (more specifically, a magnetic field of the rotor 55). Based on a result of the detection, the magnetic sensor 131 outputs an analog signal corresponding to a fuel amount stored in the second storage part 16.

Interconnection for connecting the first and second fuel amount detectors 36 and 22 and a fuel meter 52 is described next. The first fuel amount detector 36 and the fuel meter 52 are connected through a power lines 42 and 42a, and a ground line 46. The power line 42 branches out into the power lines 42a and 42b inside the fuel tank 12. The power line 42a is connected to the VDD terminal 45a. According to this, the first fuel amount detector 36 operate in response to power supplied through the power lines 42 and 42a. The ground line 46 is connected to the reference terminal 45b. Thus, the first fuel amount detector 36 is grounded through the ground line 46.

The output terminal 45c of the first fuel amount detector 36 is connected through the connecting cable 47 to the reference terminal 35b of the second fuel amount detector 22. As a result, an analog signal output from the first fuel amount detector 36 is inputted through the connecting cable 47 to the second fuel amount detector 22. The second fuel amount detector 22 and the fuel meter 52 are connected through the power lines 42 and 42b and an output line 44. The power line 42b is connected to the VDD terminal 35a. According to this, the second fuel amount detector 22 operate in response to power supplied through the power lines 42 and 42b. The power line 42, the ground line 46, and the output line 44 from among the aforementioned interconnection penetrate a lid member 40 closing an opening of the fuel tank 12 to extend from the inside of the fuel tank 12 to the outside of the fuel tank 12.

The fuel meter 52 has a CPU 48 and a display 50. An output voltage value is inputted to the CPU 48. The CPU 48 specifies a fuel amount stored in the fuel tank 12 based on an output voltage value inputted through the output line 44 and displays the specified fuel amount on the display 50. The CPU 48 and the display 50 can be formed in the same way as corresponding ones of a publicly and conventionally known fuel meter.

The magnetic sensor units 41 and 31 are described in detail next by referring to FIG. 2. The magnetic sensor unit 41 comprises the magnetic sensor 141. The magnetic sensor 141 is a magnetic sensor to detect the rotation angle of the arm 34. As an example, the magnetic sensor 141 can be a publicly known sensor using a hall element. The magnetic sensor unit 41 generates an analog signal corresponding to the rotation angle of the rotor 45. The rotation angle of the rotor 45 is the rotation angle of the arm 34. Thus, the rotation angle of the rotor 45 changes in response to the liquid level of fuel stored in the first storage part 14. The magnetic sensor 141 generates the analog signal proportional to a liquid level by using table data prescribing the following relationship: "(voltage value of analog signal of magnetic sensor 141) relative to (liquid level of fuel stored in first storage part 14)." The table data is generated in advance and stored in a memory of the magnetic sensor 141. The magnetic sensor unit 41 outputs the analog signal through the output terminal 45c. The first fuel amount detector 36 is grounded through the reference terminal 45b. Thus, the analog signal assumes a ground (specifically, 0 V) as a reference voltage. The reference terminal 45b is connected to the magnetic sensor 141.

The magnetic sensor unit 31 includes the magnetic sensor 131 and a calculating part (i.e. correction circuit) 25. The magnetic sensor 131 is configured in the same way as the magnetic sensor 141. The magnetic sensor 131 generates an analog signal corresponding to the rotation angle of the rotor 55 (specifically, the rotation angle of the arm 26). Specifically, the magnetic sensor 131 generates the analog signal proportional to a liquid level by using table data prescribing the following relationship: "(voltage value of analog signal of magnetic sensor 131) relative to (liquid level of fuel stored in second storage part 16)." The table data is generated in advance and stored in a memory of the magnetic sensor unit 31. The magnetic sensor 131 receives an analog signal from the magnetic sensor unit 41 inputted through the reference terminal 35b. Thus, the magnetic sensor unit 31 outputs an analog signal in which the aforementioned analog signal generated by the magnetic sensor 131 and the analog signal outputted from the magnetic sensor 141 are integrated.

The magnetic sensor 131 is connected to the calculating part 25. The calculating part 25 is a circuit to correct an analog signal inputted to the calculating part 25 and output the corrected analog signal to the fuel meter 52. The calculating part 25 receives an analog signal outputted from the magnetic sensor 131. In the below, a voltage value of the analog signal outputted from the magnetic sensor 131, specifically a voltage value of the analog signal inputted to the calculating part 25 is called an "integrated voltage value." In response to input of an analog signal having the integrated voltage value, the calculating part 25 corrects the analog signal and outputs the corrected analog signal to the fuel meter 52 through the output terminal 35c and the output line 44. In the below, a value of the analog signal outputted from the calculating part 25 is called an "output voltage value."

Figure 4:
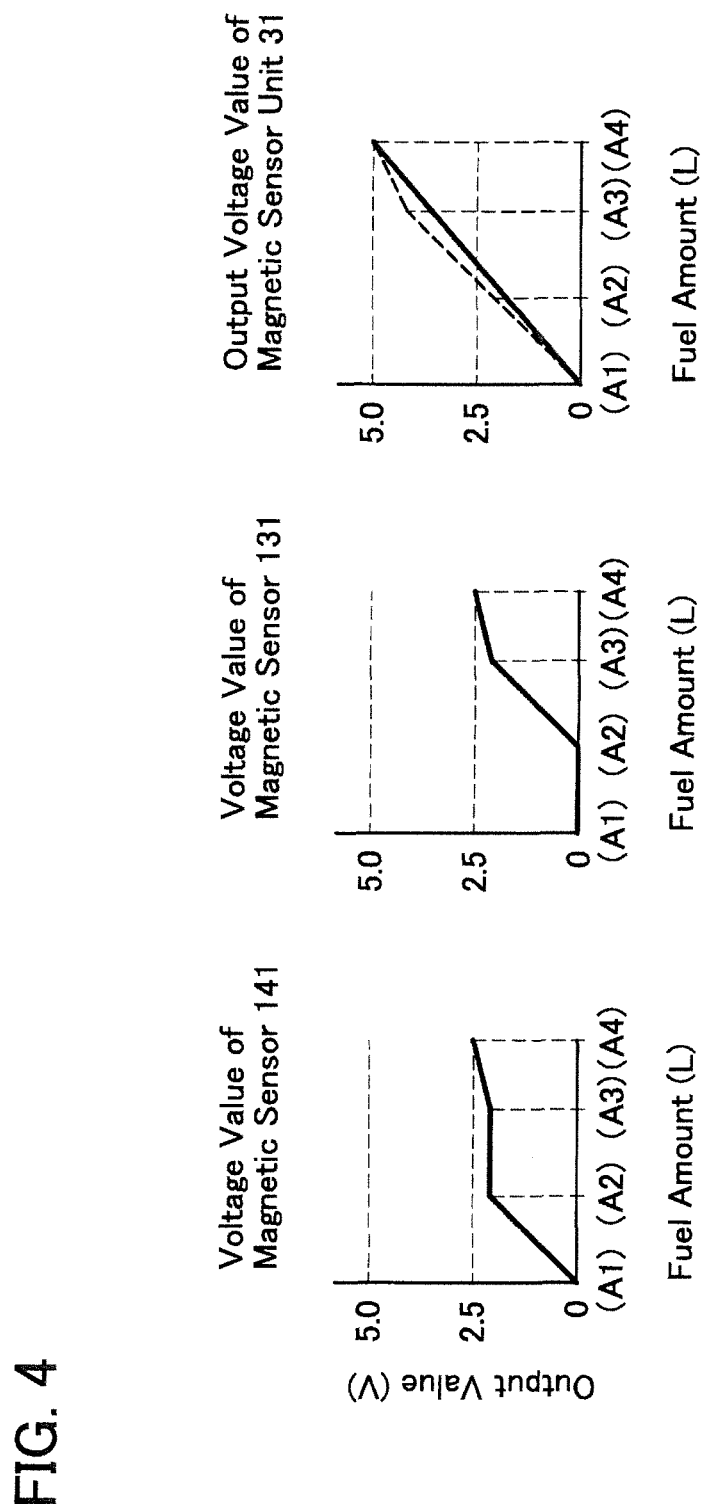
FIG. 4 shows how each voltage value changes.

The calculating part 25 has a circuit to correct an analog signal such that a voltage value of an analog signal inputted to the calculating part 25 (specifically, analog signal output from the magnetic sensor 131) becomes the output voltage value (shown by the solid line of the graph on the right side of FIG. 4). The calculating part 25 corrects an analog signal inputted to the calculating part 25 such that the output voltage value is proportional to a fuel amount in the fuel tank 12. More specifically, as shown by the graph on the right side of FIG. 4, the calculating part 25 controls an analog signal such that: the output voltage value follows a straight line passing through the origin; and along which a voltage value of the analog signal becomes 5.0 V if a fuel amount is a maximum value of a fuel amount that can be stored in the first and second storage parts 14 and 16. As a result, the output voltage value of an analog signal outputted from the calculating part 25 to the fuel meter 52 can be proportional to a fuel amount in the fuel tank 12.

Specific examples of the operations of the magnetic sensor units 31 and 41 are described below by referring to FIGS. 3 and 4. Described first is how a voltage value of an analog signal outputted from each of the fuel amount detecting device 10 and the magnetic sensor units 31 and 41 is set. The fuel amount detecting device 10 is to output 0 V as a minimum voltage value if a total fuel amount stored in the first and second storage parts 14 and 16 is a minimum value (specifically, if no fuel is stored). The fuel amount detecting device 10 is to output 5.0 V as a maximum voltage value if the total fuel amount stored in the first and second storage parts 14 and 16 is a maximum value.

A maximum value of a voltage value of an analog signal (hereinafter simply called a "voltage value") outputted from the magnetic sensor 141 is determined by the minimum voltage value (specifically, 0 V), the maximum voltage value (specifically, 5.0 V), and a first fuel amount ratio. The first fuel amount ratio is a ratio of a fuel amount that can be stored in the first storage part 14 to a total fuel amount that can be stored in the first and second storage parts 14 and 16. More specifically, the maximum value of the voltage value of the magnetic sensor 141 is determined by multiplexing a difference between the maximum and minimum voltage values (specifically, 5 V) by the first fuel amount ratio. In this embodiment, a ratio between the fuel amount that can be stored in the first storage part 14 and a fuel amount that can be stored in the second storage part 16 is 1:1. Thus, the maximum value of the voltage value of the magnetic sensor 141 is set at 2.5 V. A maximum value of a voltage value of the magnetic sensor 131 is determined by the minimum voltage value (specifically, 0 V), the maximum voltage value (specifically, 5.0 V), and a second fuel amount ratio. As described above, the voltage value of the magnetic sensor 131 is actually the integrated voltage value. Meanwhile, in the below, the voltage value of the magnetic sensor 131 is described as a voltage value of a signal to be outputted from the magnetic sensor 131 based on the assumption that a voltage value of a signal input to the magnetic sensor 131 through the reference terminal 35b (specifically, a reference voltage) is 0 V (specifically, this voltage value of the signal to be outputted from the magnetic sensor 131 is determined by subtracting the voltage value of the magnetic sensor 141 from the integrated voltage value). The second fuel amount ratio is a ratio of the fuel amount that can be stored in the second storage part 16 to the total fuel amount that can be stored in the first and second storage parts 14 and 16 (specifically, this rate is ½). More specifically, the maximum value of the voltage value of the magnetic sensor 131 is determined by multiplexing the difference between the maximum and minimum voltage values by the second fuel amount ratio. Thus, the maximum value of the voltage value of the magnetic sensor 131 is 2.5 V.

Figure 3:
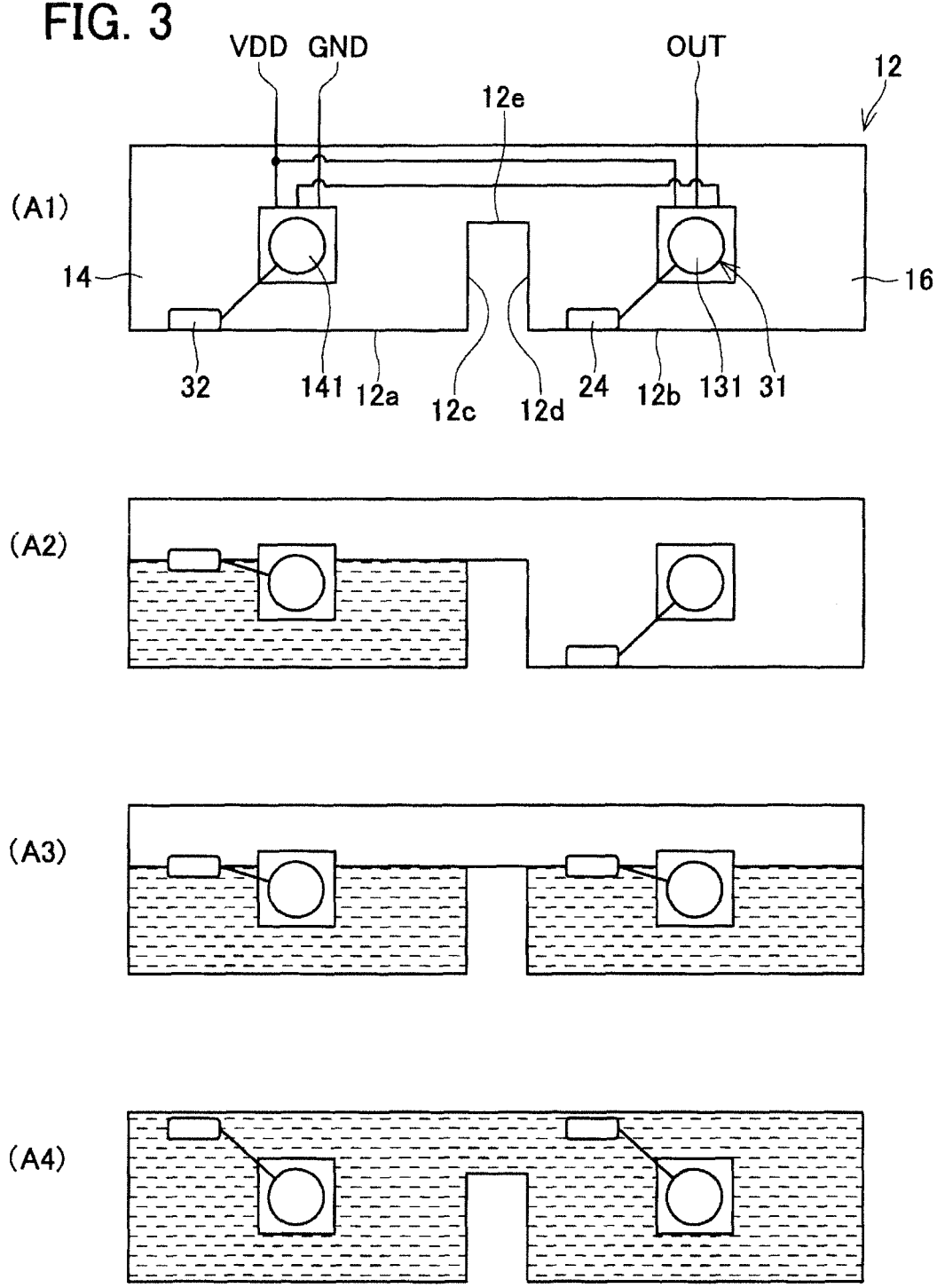
FIG. 3 shows how fuel is filled in each storage part of a first embodiment.

FIG. 3 schematically shows how fuel is filled in the fuel tank 12. More specifically, the fuel is supplied to the first storage part 14 in a state A1 where no fuel is stored in the fuel tank 12. Then, The state A1 transits to a state A2 where the fuel is stored in the first storage part 14. When the liquid level of the fuel in the first storage part 14 reaches the upper end of the first sidewall part 12c, the fuel is thereafter supplied to the second storage part 16. The state A2 transits to a state A3, specifically a state where the fuel is also stored in the second storage part 16. When the liquid level of the fuel in the second storage part 16 reaches the upper end of the second sidewall part 12d, the fuel is thereafter filled in the first and second storage parts 14 and 16 simultaneously. As a result, the state A3 transits to a state A4, specifically, a state where the first and second storage parts 14 and 16 are full of the fuel. FIG. 4 shows how the respective voltages values of analog signals output from the magnetic sensors 141 and 131 and the output voltage value change corresponding to each of the states A1 to A4 of the fuel tank 12 of FIG. 3. Regarding the graph on the right side showing the output voltage value, the solid line shows the output voltage value and the dashed line shows the integrated voltage value. If a fuel amount is reduced by consumption of the fuel stored in the fuel tank 12, the state of the fuel tank 12 changes in the following order: states A4, A3, A2, and A1. According to a modification, fuel in the first storage part 14 and fuel in the second storage part 16 may be reduced simultaneously.

A voltage value of the magnetic sensor 141, that of the magnetic sensor 131, and the output voltage value corresponding to a liquid level in the fuel tank 12 are described next. In the state A1 of FIG. 3, the fuel is not stored in the fuel tank 12. At this time, the voltage value of the magnetic sensor 141, that of the magnetic sensor 131, and the output value are all 0 V (state A1 of FIG. 4).

When the fuel is filled in the first storage part 14, the float 32 moves up in response to the liquid level of the fuel stored in the first storage part 14 (from the state A1 to the state A2 of FIG. 3). This increases the voltage value of the magnetic sensor 141 (from the state A1 to the state A2 of the graph on the left side of FIG. 4). The voltage value of the magnetic sensor 141 increases in proportion to a fuel amount stored in the fuel tank 12. Regarding the graph on the left side of FIG. 4, a slope of the graph indicating the voltage value of the magnetic sensor 141 during a transition from the state A1 to the state A2 is defined as a. The voltage value of the magnetic sensor 141 increases until the liquid level of the fuel reaches the upper end of the first sidewall part 12c (from the state A1 to the state A2 of FIGS. 3 and 4). Meanwhile, the fuel is not stored in the second storage part 16. Thus, the voltage value of the magnetic sensor 131 is kept at 0 V (from the state A1 to the state A2 of the graph in the middle of FIG. 4). Thus, an analog signal of the integrated voltage value equal to the voltage value of the magnetic sensor 141 is inputted to the calculating part 25. The calculating part 25 corrects the inputted analog signal such that the integrated voltage value of the inputted analog signal becomes the output voltage value. The output voltage value is smaller than the integrated voltage value. As a result, the calculating part 25 outputs the output voltage value proportional to the total fuel amount stored in the first and second storage parts 14 and 16 (see a period from the state A1 to the state A2 of the graph on the right side of FIG. 4).

Next, the fuel is filled in the second storage part 16 (from the state A2 to the state A3 of FIG. 3). At this time, the liquid level of the fuel stored in the first storage part 14 does not change, so that the position of the float 32 does not change. This causes no change in the voltage value of the magnetic sensor 141 (from the state A2 to the state A3 of the graph on the left side of FIG. 4). Meanwhile, the float 24 moves up as the liquid level of the fuel stored in the second storage part 16 becomes higher. This increases the voltage value of the magnetic sensor 131 in proportion to the fuel amount (from the state A2 to the state A3 of the graph in the middle of FIG. 4). At this time, a slope of the graph indicating the voltage value of the magnetic sensor 131 is α. The voltage value of the magnetic sensor 131 increases until the liquid level of the fuel reaches the upper end of the second sidewall part 12d. The integrated voltage value increases by the increase in the voltage value of the magnetic sensor 131. As a result, the integrated voltage value becomes proportional to the fuel amount filled in the fuel tank 12 both in the period from the state A1 to the state A2 and in a period from the state A2 to the state A3. An analog signal of the integrated voltage value is inputted to the calculating part 25. The calculating part 25 corrects the input analog signal such that the integrated voltage value of the inputted analog signal becomes the output voltage value. The output voltage value is smaller than the integrated voltage value.

Next, the fuel is filled simultaneously in the first and second storage parts 14 and 16 (from the state A3 to the state A4 of FIG. 3). At this time, the liquid level of the fuel stored in the first storage part 14 increases, so that the float 32 moves up in response to the liquid level. Thus, the voltage value of the magnetic sensor 141 increases in proportion to the fuel amount (from the state A3 to the state A4 of the graph on the left side of FIG. 4). A slope of the graph indicating the voltage value of the magnetic sensor 141 is defined as β. In a period from the state A3 to the state A4, the fuel is filled simultaneously in the first and second storage parts 14 and 16. Thus, the slope β differs from the slope α of the graph indicating the voltage value of the magnetic sensor 141 in the period from the state A1 to the state A2 when the fuel is stored only in the first storage part 14. Specifically, an amount of the change in the voltage value of the magnetic sensor 141 relative to the change in the fuel amount differs between the period from the state A3 to the state A4 and the period from the state A1 to the state A2. When the total fuel amount stored in the first and second storage parts 14 and 16 becomes the maximum value, the voltage value of the magnetic sensor 141 becomes 2.5 V that is the maximum value thereof.

During a transition from the state A3 to the state A4 of FIG. 3, the voltage value of the magnetic sensor 131 increases in the same way as the voltage value of the magnetic sensor 141. Specifically, a slope of the graph indicating the voltage value of the magnetic sensor 131 is β. When the total fuel amount stored in the first and second storage parts 14 and 16 becomes the maximum value, the voltage value of the magnetic sensor 131 becomes 2.5 V that is the maximum value thereof.

The difference between the slopes α and β is described in detail. The respective areas of the first and second plate-shaped parts 12a and 12b are both defined as S and that of the third plate-shaped part 12e is defined as T. A cross-sectional area $U_{A2}$ of a part where the fuel is stored in the fuel tank 12 in the period from the state A1 to the state A2 is equal to the area S of the first plate-shaped part 12a. Here, a "cross-sectional area" refers to an area as seen in a cross section taken parallel to the horizontal plane. Meanwhile, a cross-sectional area $U_{A4}$ of a part where the fuel is stored in the fuel tank 12 in the period from the state A3 to the state A4 is equal to the sum of the area S of the first plate-shaped part 12a, the area S of the second plate-shaped part 12b, and the area T of the third plate-shaped part 12e (2S+T). Specifically, the cross-sectional area $U_{A4}$ is larger than the double of the cross-sectional area $U_{A2}$. Thus, if the fuel of the same amount is added in the period from the state A1 to the state A2 and the period from the state A3 to the state A4, an amount of change in a liquid level to increase in the period from the state A3 to the state A4 becomes less than half of an amount of change in the liquid level to increase in the period from the state A1 to the state A2. Specifically, the slope β becomes less than α/2.

A slope of the graph indicating the integrated voltage value in the period from the state A3 to the state A4 of FIG. 4 is 2β (specifically, less than α). Specifically, the slope 2β of the graph indicating the integrated voltage value in the state A4 differs from the slope α of the graph indicating the integrated voltage value in the period from the state A1 to the state A2 and the period from the state A2 to the state A3. As a result, the integrated voltage value does not become proportional completely to the total fuel amount stored in the first and second storage parts 14 and 16. When the total fuel amount stored in the first and second storage parts 14 and 16 becomes the maximum value, the integrated voltage value becomes 5.0 V that is the maximum value thereof. The calculating part 25 corrects an analog signal inputted to the calculating part 25 to an analog signal of the output voltage value proportional to the total fuel amount stored in the first and second storage parts 14 and 16.

Where the fuel is to be supplied from the fuel tank 12 to an engine of an automobile (not shown in the drawings), the state of the fuel tank 12 changes in the following order: states A4, A3, A2, and A1. Thus, the voltage value of the magnetic sensor 131 changes in response to reduction in the fuel in the first storage part 14 as shown by the graph on the left side of FIG. 4. Likewise, the voltage value of the magnetic sensor 141 changes in response to reduction in the fuel in the second storage part 16 as shown by the graph in the middle of FIG. 4. As a result, the output voltage value becomes smaller in proportion to the fuel amount in the fuel tank 12 as shown by the graph on the right side of FIG. 4.

Advantageous Effect of First Embodiment

In this embodiment, an analog signal outputted from the magnetic sensor 141 is inputted from the magnetic sensor unit 41 to the magnetic sensor unit 31 through the connecting cable 47 and the reference terminal 35b. The magnetic sensor unit 31 outputs the output voltage value corresponding to the integrated voltage value in which a voltage value of the magnetic sensor 141 and a voltage value of the magnetic sensor 131 are integrated. This feature allows the second fuel amount detector 22 to output the output voltage value corresponding to a total liquid amount in the first and second storage parts 14 and 16 while the voltage value of the magnetic sensor 141 is assumed as a reference voltage value. In this way, according to the aforementioned feature, the connecting cable 47 for outputting an analog signal from the first fuel amount detector 36 functions as the connecting cable 47 for outputting the reference voltage value to the second fuel amount detector 22. As a result, increase in the total number of connecting cables can be curbed.

In this embodiment, there are three connecting cables (specifically, power line 42, output line 44, and ground line 46) penetrating the fuel tank 12 to extend from the inside to the outside of the fuel tank 12. In contrast, in the feature that each of output voltage values indicating liquid amounts in the first and second storage parts 14 and 16 is to be acquired from the first and second fuel amount detectors 36 and 22, the number of output lines penetrating the fuel tank 12 to extend from the inside to the outside of the fuel tank 12 increases by one compared to this embodiment. Specifically, according to this embodiment increase in the number of connecting cables penetrating the fuel tank 12 to extend from the inside to the outside of the fuel tank 12 can be curbed. As a result, parts of the fuel tank 12 to be sealed can be reduced, thereby sealing performance of the fuel tank 12 can be enhanced.

As described above, the integrated voltage value does not become proportional completely to a total liquid amount stored in the first and second storage parts 14 and 16. Thus, in order to display a correct fuel amount on the display 50, the integrated voltage value is corrected, by the calculating part 25, to the output voltage value proportional to the total liquid amount stored in the first and second storage parts 14 and 16. Since the magnetic sensor unit 31 comprises the calculating part 25, an apparatus external to the fuel amount detecting device 10 (specifically, fuel meter 52) becomes free from the necessity of correcting the integrated voltage value.

Second Embodiment

Figure 5:
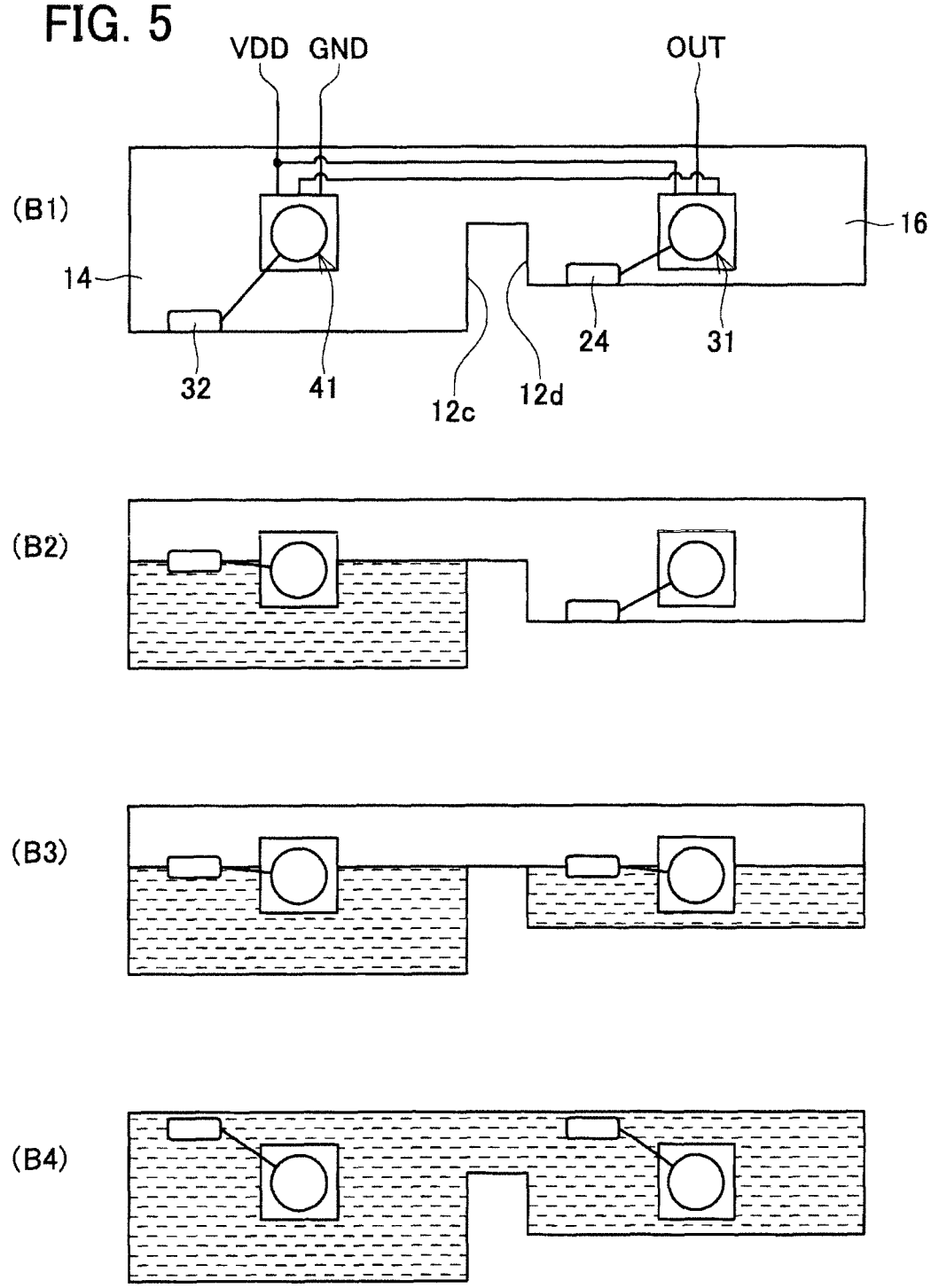
FIG. 5 shows how fuel is filled in each storage part of a second embodiment.
Figure 6:
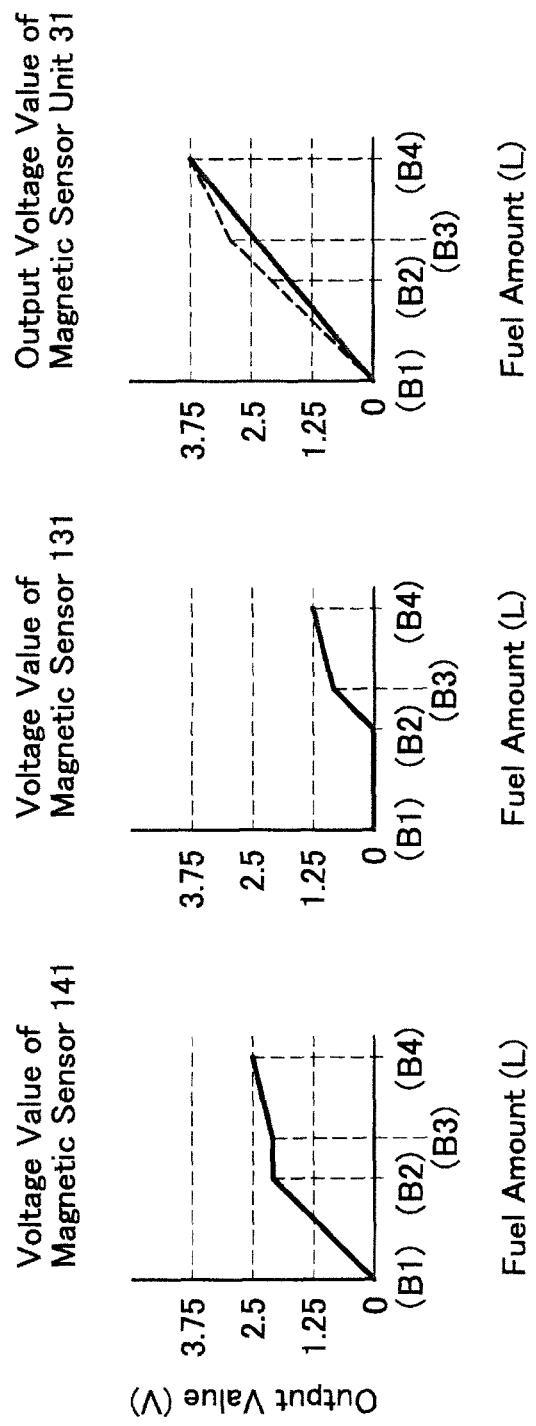
FIG. 6 shows how each voltage value changes.

A second embodiment is described by referring to FIGS. 5 and 6. This description is mainly about a difference from the first embodiment. In this embodiment, the fuel amount detecting device 10 is to output 0 V as a minimum voltage value if a total fuel amount stored in the first and second storage parts 14 and 16 is a minimum value (specifically, if no fuel is stored). The fuel amount detecting device 10 is to output 3.75 V as a maximum voltage value if the total fuel amount stored in the first and second storage parts 14 and 16 is a maximum value. The second sidewall part 12d is shorter than the first sidewall part 12c. A ratio between respective fuel amounts that can be stored in the storage parts 14 and 16 is 2:1. A maximum value of a voltage value of the magnetic sensor 141 and a maximum value of a voltage value of the magnetic sensor 131 are set such that a ratio between the maximum value of the voltage value of the magnetic sensor 141 and the maximum value of the voltage value of the magnetic sensor 131 becomes equal to the ratio between the respective fuel amounts that can be stored in the storage parts 14 and 16. More specifically, the maximum value of the voltage value of the magnetic sensor 141 is 2.5 V and the maximum value of the voltage value of the magnetic sensor 131 is 1.25 V.

The calculating part 25 controls an analog signal such that the output voltage value (shown by the solid line of the graph on the right side of FIG. 6) follows a straight line passing through the origin and along which a voltage value of the analog signal becomes 3.75 V if a fuel amount is a maximum value of a fuel amount that can be stored in the first and second storage parts 14 and 16.

FIG. 5 schematically shows how fuel is filled in the fuel tank 12. FIG. 6 shows how the respective voltages values of analog signals outputted from the magnetic sensors 141 and 131 and the output voltage value change in association with each of states B1 to B4 of the fuel tank 12 of FIG. 5.

A voltage value of the magnetic sensor 141 and a voltage value of the magnetic sensor 131, and the output voltage value are described next. A state B1 and a state B2 of FIGS. 5 and 6 are the same as the states A1 and A2 of FIGS. 3 and 4.

When fuel is supplied further in the state B2, the fuel is stored in the second storage part 16 (state B3 of FIG. 5). At this time, like in the state A3 of FIG. 4, the voltage value of the magnetic sensor 141 does not change (from the state B2 to the state B3 of the graph on the left side of FIG. 6) while the voltage value of the magnetic sensor 131 increases in proportion to the fuel amount (from the state B2 to the state B3 of the graph in the middle of FIG. 6). At this time, a slope of the graph indicating the voltage value of the magnetic sensor 131 is α. The voltage value of the magnetic sensor 131 increases until the liquid level of the fuel reaches the upper end of the second sidewall part 12d. The second sidewall part 12d is shorter than the first sidewall part 12c, so that the fuel stored in the second storage part 16 is less than the fuel stored in the first storage part 14 in the state B3. Thus, the voltage value of the magnetic sensor 131 smaller than the voltage value of the magnetic sensor 141 in the state B3 (state B3 of the graph on the left side and that of the graph in the middle of FIG. 6). The integrated voltage value increases by the increase in the voltage value of the magnetic sensor 131. As a result, the integrated voltage value becomes proportional to the fuel amount stored in the fuel tank 12 both in a period from the state B1 to the state B2 and in a period from the state B2 to the state B3. Like in the first embodiment, the calculating part 25 corrects an inputted analog signal such that the integrated voltage value of the inputted analog signal becomes the output voltage value (specifically, a voltage value shown by the solid line of the graph on the right side of FIG. 6). The output voltage value is smaller than the integrated voltage value.

Next, the fuel is filled simultaneously in the first and second storage parts 14 and 16 (from the state B3 to the state B4 of FIG. 5). At this time, the liquid level of the fuel stored in the first storage part 14 increases, so that the float 32 moves up in response to the liquid level. Thus, the voltage value of the magnetic sensor 141 increases in proportion to the fuel amount (from the state B3 to the state B4 of the graph on the left side of FIG. 6). At this time, a slope of the graph indicating the voltage value of the magnetic sensor 141 is defined as β. When the total fuel amount stored in the first and second storage parts 14 and 16 becomes the maximum value, the voltage value of the magnetic sensor 141 becomes 2.5 V that is the maximum value thereof.

During a transition from the state B3 to the state B4 of FIG. 6, the voltage value of the magnetic sensor 131 increases in the same way as the voltage value of the magnetic sensor 141. Specifically, a slope of the graph indicating the voltage value of the magnetic sensor 131 is β. When the total fuel amount stored in the first and second storage parts 14 and 16 becomes the maximum value, the voltage value of the magnetic sensor 131 becomes 1.25 V that is the maximum value thereof.

Like in the first embodiment, the integrated voltage value does not become proportional completely to the total fuel amount stored in the first and second storage parts 14 and 16. When the total fuel amount stored in the first and second storage parts 14 and 16 becomes the maximum value, the integrated voltage value becomes 3.75 V that is the maximum value thereof.

Like in the first embodiment, the calculating part 25 corrects an analog signal inputted to the calculating part 25 to an analog signal of the output voltage value proportional to the total fuel amount stored in the first and second storage parts 14 and 16.

Advantageous Effect of Second Embodiment

This embodiment achieves advantageous effect comparable to that of the first embodiment. Additionally, according to this embodiment, even if fuel amounts that can be stored in the first and second storage parts 14 and 16 differ, the fuel amount detecting device 10 can detect a fuel amount properly.

Third Embodiment

Figure 7:
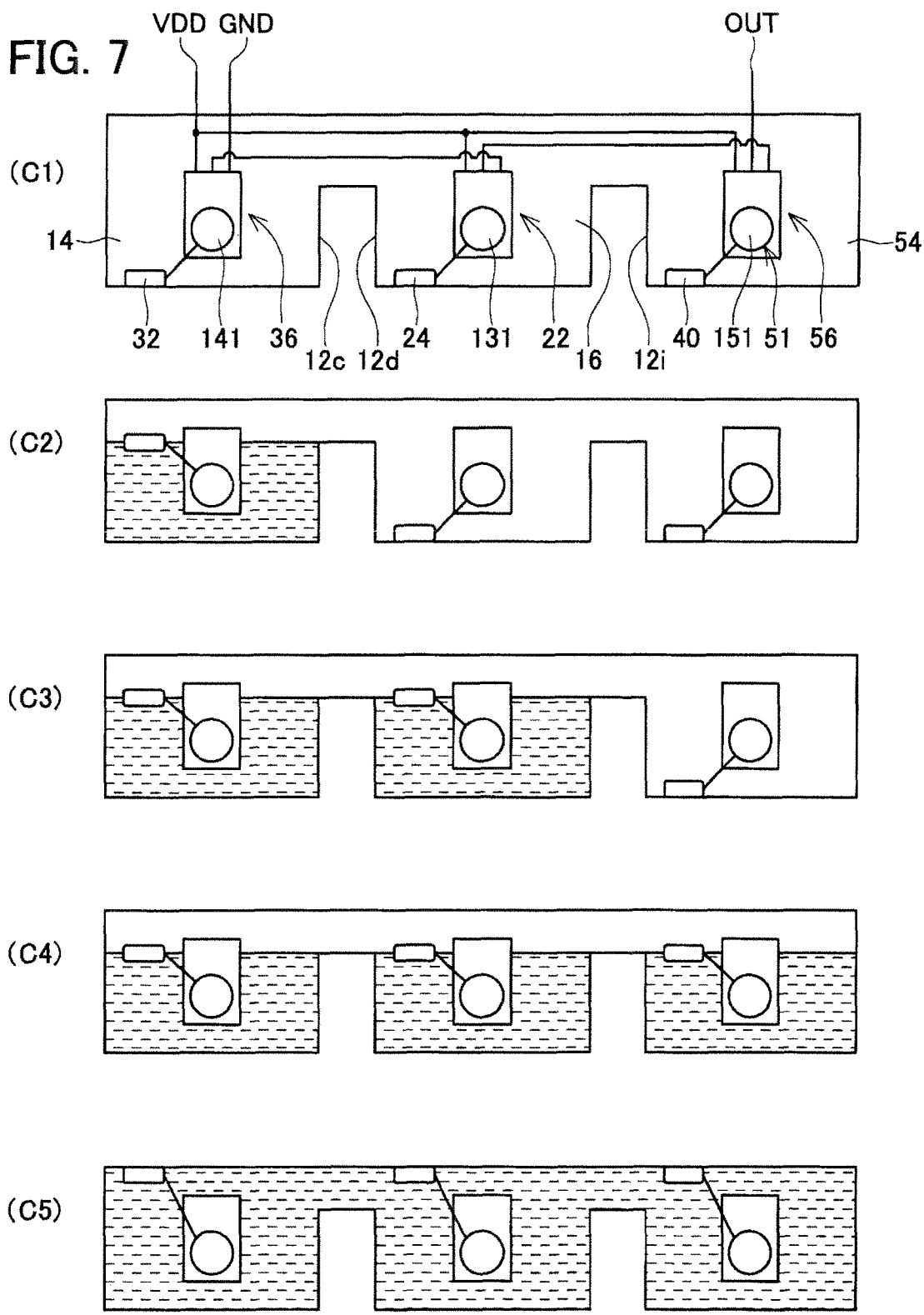
FIG. 7 shows how fuel is filled in each storage part of a third embodiment.
Figure 8:
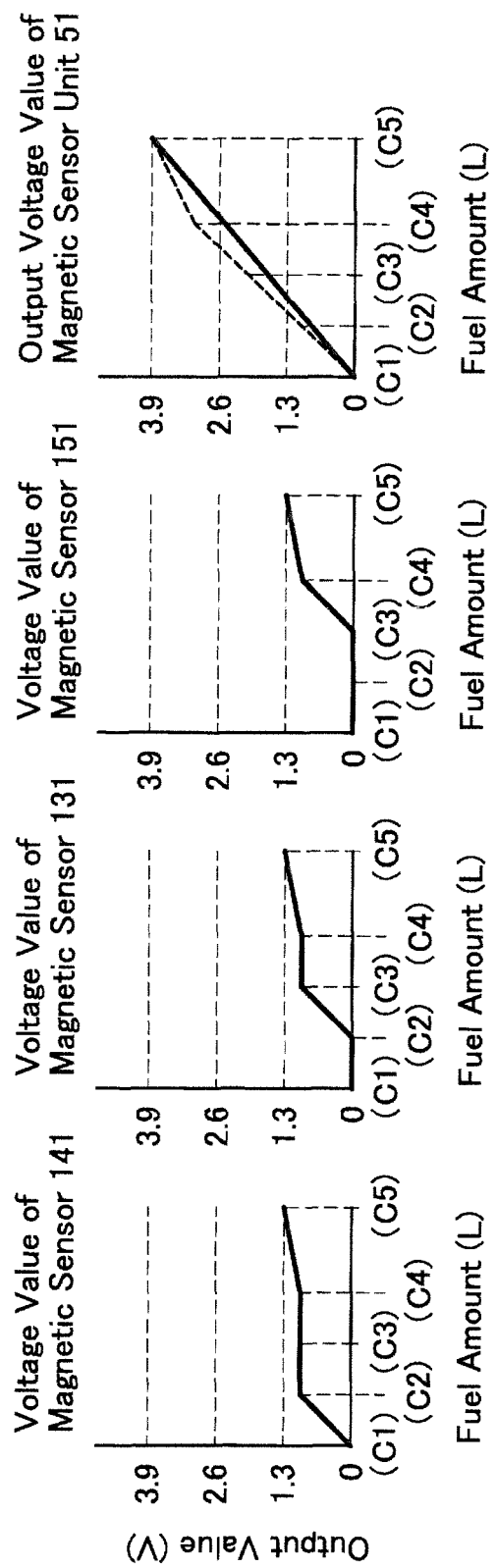
FIG. 8 shows how each voltage value changes.

A third embodiment is described by referring to FIGS. 7 and 8. This description is mainly about a difference from the first embodiment. In this embodiment, the fuel amount detecting device 10 comprises a third fuel amount detector 56 arranged in a third storage part 54 in addition to the first and second fuel amount detectors 36 and 22. In this embodiment, the second fuel amount detector 22 does not comprise the calculating part 25. An integrated voltage value in which a voltage value of the magnetic sensor 141 and a voltage value of the magnetic sensor 131 are integrated is outputted through the output terminal 35c of the second fuel amount detector 22. This integrated voltage value is inputted to the third fuel amount detector 56 through a reference terminal of the third fuel amount detector 56 (not shown in the drawings). An output voltage value is output through an output terminal of the third fuel amount detector 56 (not shown in the drawings). This output voltage value corresponds to an integrated voltage value in which a voltage value of a magnetic sensor 151 of the third fuel amount detector 56 and the integrated voltage value output through the output terminal 35c of the second fuel amount detector 22 are integrated. In other words, the output voltage value corresponds to an integrated voltage value in which the voltage value of the magnetic sensor 141, the voltage value of the magnetic sensor 131, and the voltage value of the magnetic sensor 151 are integrated. The voltage value of the magnetic sensor 151 is actually the integrated voltage value. Meanwhile, in the below, the voltage value of the magnetic sensor 151 is described as a voltage value of a signal to be outputted from the magnetic sensor 151 based on the assumption that a voltage value of a signal inputted to the magnetic sensor 151 through the reference terminal of the third fuel amount detector 56 (specifically, a reference voltage) is 0 V (specifically, this voltage value of the signal to be output from the magnetic sensor 151 is determined by subtracting the voltage value of the magnetic sensor 141 and that of the magnetic sensor 131 from the integrated voltage value). This integrated voltage value is corrected to the aforementioned output voltage value by a calculating part (i.e. correction circuit, not shown in the drawings) in the third fuel amount detector 56. In the following description of this embodiment, the "output voltage value" means a voltage value outputted from a magnetic sensor unit 51 of the third fuel amount detector 56. The "integrated voltage value" means a voltage value corresponding to this output voltage value. In this embodiment, the fuel amount detecting device 10 is to output 0 V as a minimum voltage value if a total fuel amount stored in the first, second, and third storage parts 14, 16, and 54 is a minimum value (specifically, if no fuel is stored). The fuel amount detecting device 10 is to output 3.9 V as a maximum voltage value if the total fuel amount stored in the first, second, and third storage parts 14, 16, and 54 is a maximum value. A ratio between fuel amounts that can be stored in the storage parts 14, 16, and 54 is 1:1:1. Thus, a maximum value of the voltage value of the magnetic sensor 141, that of the magnetic sensor 131, and that of the magnetic sensor 151 are all set at 1.3 V.

The calculating part controls an analog signal such that the output voltage value (shown by the solid line of the graph at the right edge of FIG. 8) follows a straight line passing through the origin and along which a voltage value of the analog signal becomes 3.9 V if a fuel amount is a maximum value of a fuel amount that can be stored in the first, second, and third storage parts 14, 16, and 54.

FIG. 7 schematically shows how fuel is filled in the fuel tank 12. More specifically, the fuel is supplied in a state C1 where no fuel is stored in the fuel tank 12. Then, a transition is made to a state C2 where the fuel is stored in the first storage part 14. When the liquid level of the fuel in the first storage part 14 reaches the upper end of the first sidewall part 12c, the fuel is thereafter supplied to the second storage part 16. This makes a transition from the state C2 to a state C3, specifically a state where the fuel is stored in the second storage part 16. When the liquid level of the fuel in the second storage part 16 reaches the upper end of the second sidewall part 12d, the fuel is thereafter supplied to the third storage part 54. This makes a transition from the state C3 to a state C4, specifically a state where the fuel is stored in the third storage part 54. When the liquid level of the fuel in the third storage part 54 reaches the upper end of a fifth sidewall part 12*i* defining a side surface of the third storage part 54, the fuel is thereafter filled in the first, second, and third storage parts 14, 16 and 54 simultaneously. As a result, a transition is made to a state C5, specifically, a state where the first, second, and third storage parts 14, 16, and 54 are full of the fuel. FIG. 8 shows how the voltages values of analog signals outputted from the magnetic sensors 141, 131 and 151 and the output voltage value change according to each of the states C1 to C5 of the fuel tank 12 of FIG. 7. Regarding the graph at the right edge showing the output voltage value, the solid line shows the output voltage value and the dashed line shows the integrated voltage value. If a fuel amount is reduced by consumption of the fuel stored in the fuel tank 12, the state of the fuel tank 12 changes in the following order: states C5, C4, C3, C2, and C1. According to a modification, fuel in the first, second, and third storage parts 14, 16, and 54 may be reduced simultaneously.

A voltage value of the magnetic sensor 141, a voltage value of the magnetic sensor 131, a voltage value of the magnetic sensor 151, and the output voltage value are described next. In the state C1 of FIG. 7, the fuel is not stored in the fuel tank 12. In this case, the voltage value of the magnetic sensor 141, the voltage value of the magnetic sensor 131, the voltage value of the magnetic sensor 151, and the output voltage value are all 0 V (state C1 of FIG. 8).

When the fuel is filled in the first storage part 14, the voltage value of the magnetic sensor 141 increases in proportion to the fuel amount stored in the fuel tank 12 (state C2 of the graph at the left edge of FIG. 8). At this time, a slope of the graph indicating the voltage value of the magnetic sensor 141 is defined as $\gamma$. The voltage value of the magnetic sensor 141 increases until the liquid level of the fuel reaches the upper end of the first sidewall part 12*c* (state C2 of FIGS. 7 and 8). Meanwhile, the voltage value of the magnetic sensor 131 and the voltage value of the magnetic sensor 151 are kept at 0 V. Thus, an analog signal of the integrated voltage value equal to the voltage value of the magnetic sensor 141 is inputted to the calculating part in the third fuel amount detector 56. The calculating part corrects the inputted analog signal such that the integrated voltage value of the inputted analog signal becomes the output voltage value. The output voltage value is smaller than the integrated voltage value. As a result, the output voltage value proportional to the total fuel amount stored in the first, second, and third storage parts 14, 16, and 54 is outputted (see a period from the state C1 to the state C5 of the graph at the right edge of FIG. 8).

Next, the fuel is filled in the second storage part 16 (from the state C2 to the state C3 of FIG. 7). At this time, the voltage value of the magnetic sensor 141 and the voltage value of the magnetic sensor 151 do not change (state C3 of the graph at the left edge and the graph at the right center of FIG. 8). Meanwhile, the voltage value of the magnetic sensor 131 increases in proportion to the fuel amount (state C3 of the graph at the left center of FIG. 8). At this time, a slope of the graph indicating the voltage value of the magnetic sensor 131 is $\gamma$. The voltage value of the magnetic sensor 131 increases until the liquid level of the fuel reaches the upper end of the second sidewall part 12*d*. The integrated voltage value increases by the increase in the voltage value of the magnetic sensor 131. As a result, the integrated voltage value becomes proportional to the fuel amount stored in the fuel tank 12 both in a period from the state C1 to the state C2 and in a period from the state C2 to the state C3. The calculating part in the third fuel amount detector 56 corrects an inputted analog signal such that the integrated voltage value of the inputted analog signal becomes the output voltage value. The output voltage value is smaller than the integrated voltage value.

Next, the fuel is filled in the third storage part 54 (from the state C3 to the state C4 of FIG. 7). At this time, the voltage value of the magnetic sensor 141 and the voltage value of the magnetic sensor 131 do not change (state C4 of the graph at the left edge and the graph at the left center of FIG. 8). Meanwhile, the voltage value of the magnetic sensor 151 increases in proportion to the fuel amount (state C4 of the graph at the right center of FIG. 8). At this time, a slope of the graph indicating the voltage value of the magnetic sensor 151 is $\gamma$. The voltage value of the magnetic sensor 151 increases until the liquid level of the fuel reaches the upper end of the fifth sidewall part 12*i*. The integrated voltage value increases by the increase in the voltage value of the magnetic sensor 151. As a result, the integrated voltage value becomes proportional to the fuel amount stored in the fuel tank 12 both in the period from the state C2 to the state C3 and in a period from the state C3 to the state C4 (specifically, in the entire period from the state C1 to the state C4). The calculating part in the third fuel amount detector 56 corrects an inputted analog signal such that the integrated voltage value of the inputted analog signal becomes the output voltage value. The output voltage value is smaller than the integrated voltage value.

Next, the fuel is stored simultaneously in the first, second, and third storage parts 14, 16, and 54 (from the state C4 to the state C5 of FIG. 7). At this time, the liquid level of the fuel stored in the first storage part 14 increases, so that the float 32 moves up together with the liquid level. Thus, the voltage value of the magnetic sensor 141 increases in proportion to the fuel amount (from the state C4 to the state C5 of FIG. 8). A slope of the graph indicating the voltage value of the magnetic sensor 141 is defined as $\Delta$. In the state C5, the fuel is stored simultaneously in the first, second, and third storage parts 14, 16, and 54. Thus, the slope $\Delta$ differs from the slope $\gamma$ of the graph indicating the voltage value of the magnetic sensor 141 in the period from the state C1 to the state C2 when the fuel is stored only in the first storage part 14. Considering in the same way as the corresponding slope in the state A4 of FIG. 3, the slope $\Delta$ becomes less than $\gamma/3$.

When the total fuel amount stored in the first, second, and third storage parts 14, 16, and 54 becomes the maximum value, the voltage value of the magnetic sensor 141 becomes 1.3 V that is the maximum value thereof.

During a transition from the state C4 to the state C5 of FIG. 8, the voltage value of the magnetic sensor 131 and that of the magnetic sensor 151 increase in the same way as the voltage value of the magnetic sensor 141. Specifically, a slope of the graph indicating the voltage value of the magnetic sensor 131 and a slope of the graph indicating the voltage value of the magnetic sensor 151 are $\Delta$. When the total fuel amount stored in the first, second, and third storage parts 14, 16, and 54 becomes the maximum value, the voltage value of the magnetic sensor 131 and the voltage value of the magnetic sensor 151 both become 1.3 V that is the maximum value of each of these voltage values.

A slope of the graph indicating the integrated voltage value in a period from the state C4 to the state C5 of FIG. 8 is $3\Delta$ (specifically, less than $\gamma$). Specifically, the slope $3\Delta$ of the graph indicating the integrated voltage value in the state C5 differs from the slope $\gamma$ of the graph indicating the integrated voltage value in the period from the state C1 to the state C2, the period from the state C2 to the state C3, and the period from the state C3 to the state C4. As a result, the integrated voltage value does not become proportional completely to the total fuel amount stored in the first, second, and third storage parts 14, 16, and 54. When the total fuel amount stored in the first, second, and third storage parts 14, 16, and 54 becomes the maximum value, the integrated voltage value becomes 3.9 V that is the maximum value thereof.

The calculating part corrects an analog signal inputted to the calculating part to an analog signal of the output voltage value proportional to the total fuel amount stored in the first, second, and third storage parts 14, 16, and 54 (specifically, a voltage value shown by the solid line of the graph at the right edge of FIG. 8).

Advantageous Effect of Third Embodiment

This embodiment achieves advantageous effect comparable to that of the first embodiment. Additionally, in this embodiment, a fuel amount can be detected properly while there are three storage parts (specifically, first, second, and third storage parts 14, 16, and 54).

Fourth Embodiment

Figure 9:
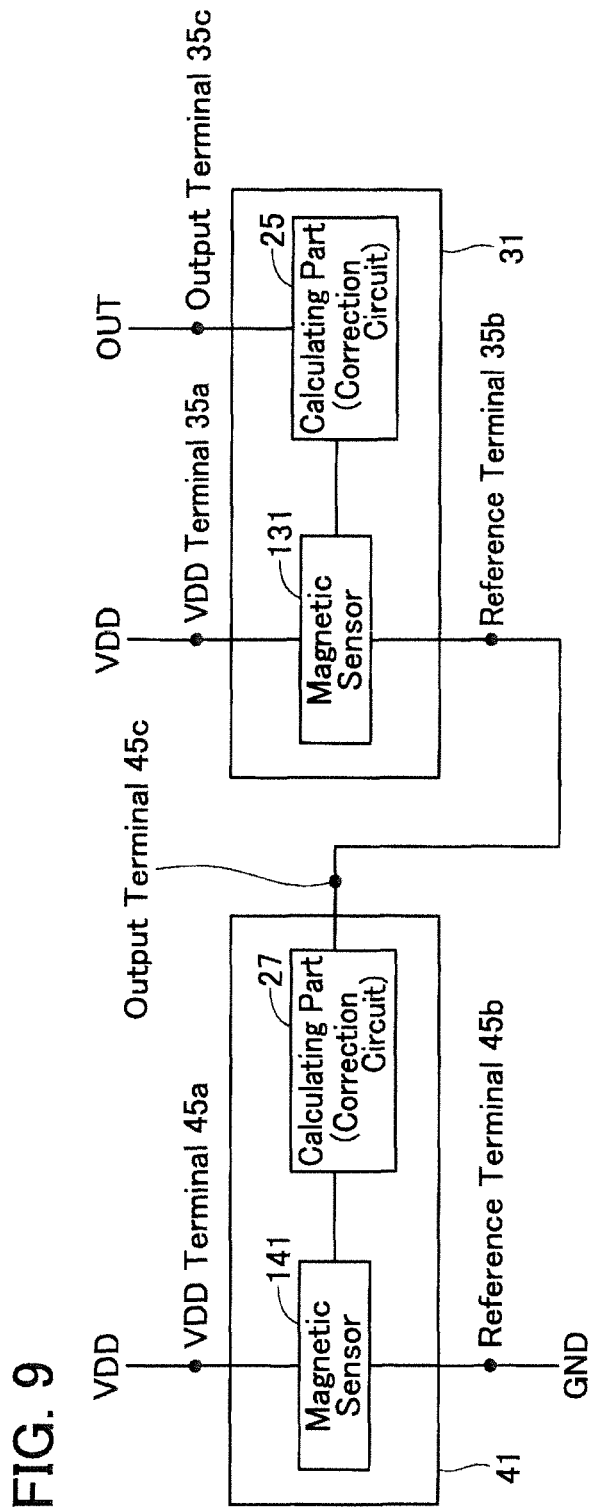
FIG. 9 shows a circuit structure of a fuel amount detecting device of a fourth embodiment.

A fourth embodiment is described by referring to FIG. 9. This description is mainly about a difference from the first embodiment. In this embodiment, the magnetic sensor 141 is connected to a calculating part (i.e. correction circuit) 27. The calculating part 27 is a circuit to correct an inputted analog signal and output the corrected analog signal through the output terminal 45*c*. The calculating part 27 receives an analog signal outputted from the magnetic sensor 141. In response to input of this analog signal, the calculating part 27 corrects the inputted analog signal and outputs the corrected analog signal through the output terminal 45*c* and the reference terminal 35*b* to the magnetic sensor unit 31.

Thus, the analog signal outputted from the magnetic sensor unit 41 and corrected by the calculating part 27 is inputted through the reference terminal 35*b* to the magnetic sensor 131. As a result, a voltage value of the magnetic sensor 131 changes relative to a liquid level in a different way from the first embodiment. Meanwhile, in this embodiment, a voltage value of the magnetic sensor 141 changes relative to the liquid level in the same way as the first embodiment. The calculating part 25 corrects an analog signal outputted from the magnetic sensor 141 and outputs an analog signal having the same output voltage value as that of the first embodiment to the fuel meter 52. According to this structure, the fuel amount detecting device 10 can output the output voltage value proportional to a total liquid amount stored in the first and second storage parts 14 and 16.

Advantageous Effect of Fourth Embodiment

This embodiment achieves advantageous effect comparable to that of the first embodiment.

While specific embodiments of the present invention have been described above in detail, these embodiments are merely illustrative and place no limitation on the scope of the patent claims. The technology described in the patent claims also encompasses various changes and modifications to the specific embodiments described above.

In each of the aforementioned embodiments, the two (or three) fuel amount detectors 36 and 22 (or additionally, 56) are arranged in the two (or three) storage parts 14 and 16 (or additionally, 54) respectively. According to a modification, four or more fuel amount detectors may be arranged in corresponding four or more storage parts. Specifically, the number of "a plurality of storage parts" is only required to be two or more.

While the minimum voltage value is 0 V in the first and second embodiments, it may alternatively be 1.0 V, for example. In this case, a minimum value of a voltage value of each of the fuel amount detectors 36 and 22 becomes 0.5 V. Setting the minimum voltage value at a value other than 0 V in this way makes it possible to determine a failure in each of the fuel amount detectors 36 and 22. Likewise, in the third embodiment, the minimum voltage value may be 1.5 V, for example. Specifically, the "minimum voltage value" may be a value other than 0 V.

In each of the aforementioned embodiments, the first and second storage parts 14 and 16 are provided in the same fuel tank 12. According to a modification, the first and second storage parts 14 and 16 may be provided in respective fuel tanks. Specifically, the "first storage part" and the "second storage part" may be provided in different vessels.

The fuel tank 12 may not be a saddle-shaped tank but it may be a tank of a rectangular parallelepiped or a cylindrical column. Specifically, the "vessel" may not comprise the "first sidewall part," "the second sidewall part," and the "third plate-shaped part."

In each of the aforementioned embodiments, the shape and the area of the cross section of the fuel tank 12 are constant. In a modification, this shape or this area may not be constant. Even in this modification, if the liquid level of fuel stored in each storage part is known, a fuel amount stored in a fuel tank can be specified. Thus, by correcting the integrated voltage value properly using a calculating part, for example, the fuel amount detecting device 10 can detect a fuel amount stored in the fuel tank 12 correctly.

In each of the aforementioned first and second embodiments, the calculating part 25 corrects the integrated voltage value to the output voltage value. Alternatively, the magnetic sensor unit 31 of each of the first and second embodiments may not comprise the calculating part 25. Specifically, the magnetic sensor unit 31 may output the integrated voltage value to the fuel meter 52 without correcting this integrated voltage value. Likewise, in the third embodiment, the magnetic sensor unit 51 may not comprise the calculating part. In this modification, an external apparatus (such as the fuel meter 52) may correct the integrated voltage value. Alternatively, the external apparatus may convert the integrated voltage value to a fuel amount by storing a relationship between the integrated voltage value and a fuel amount stored in the fuel tank 12 in advance.

In the first embodiment, a graph indicating the output voltage value follows a straight line passing through the origin and along which a voltage value of an analog signal becomes 5.0 V if a fuel amount is a maximum value of a fuel amount that can be stored in the first and second storage parts 14 and 16 (graph on the right side of FIG. 4). Alternatively, according to a modification, the graph indicating the output voltage value may follow a straight line passing through the origin and along which a voltage value of an analog signal becomes larger than or smaller than 5.0 V if a fuel amount is a maximum value of a fuel amount that can be stored in the first and second storage parts 14 and 16. Specifically, the output voltage value is required only to be proportional to a total liquid amount stored in the first and second storage parts 14 and 16. This modification is further applicable to the second and third embodiments.

The technical elements explained in the present description or drawings provide technical utility either independently or through various combinations. The present invention is not limited to the combinations described at the time the claims are filed. Further, the purpose of the embodiments illustrated by the present description or drawings is to satisfy multiple objectives simultaneously, and satisfying any one of those objectives gives technical utility to the present invention.

What is claimed is:

1. A liquid amount detecting device configured to detect a total liquid amount stored in a plurality of storage parts including a first storage part and a second storage part, the liquid amount detecting device comprising:
    a first detector disposed in the first storage part;
    a second detector disposed in the second storage part; and
    a connecting cable for connecting the first detector and the second detector,
wherein the first detector comprises:
    a first float;
    a first arm configured to convert a vertical movement of the first float to a rotational movement;
    a first magnetic sensor configured to generate a first analogue signal corresponding to the rotational movement of the first arm; and
    a first input terminal connected to a power source;
    a first reference terminal connected to the ground;
    a first output terminal having one end of the connecting cable connected, and configured to output a first output voltage value corresponding to a voltage value indicated by the first analogue signal,
wherein the second detector comprises:
    a second float;
    a second arm configured to convert a vertical movement of the second float to a rotational movement;
    a second magnetic sensor configured to generate a second analogue signal corresponding to the rotational movement of the second arm;
    a second input terminal connected to a power source;
    a second reference terminal connected to the other end of the connecting cable, and configured to input to the second detector the first output voltage value outputted from the first output terminal, the first output voltage value being different from a voltage value of the ground; and
    a second output terminal configured to output to a CPU a second output voltage value corresponding to an integrated voltage value in which a voltage value indicated by the second analogue signal and the first output voltage value inputted to the reference terminal via the connecting cable are integrated.

2. The liquid amount detecting device as in claim 1, wherein
    the liquid amount detecting device is configured to:
    output a minimum voltage value in a case where the total liquid amount stored in the plurality of storage parts is a minimum value; and
    output a maximum voltage value in a case where the total liquid amount stored in the plurality of storage parts is a maximum value,
    a maximum value of the first output voltage value is a value determined in accordance with the minimum voltage value, the maximum voltage value, and a predetermined liquid amount ratio, and
    the predetermined liquid amount ratio is a ratio of a liquid amount which the first storage part is capable of storing and the total liquid amount which the plurality of storage parts is capable of storing.

3. The liquid amount detecting device as in claim 1, wherein
    the first storage part and the second storage part are arranged in a same vessel, and
    the vessel comprises:
        a first plate-shaped part having a dimension along a horizontal plane and defining a bottom surface of the first storage part;
        a second plate-shaped part having a dimension along the horizontal plane and defining a bottom surface of the second storage part;
        a first sidewall part extending upward from the first plate-shaped part and defining a side surface of the first storage part;
        a second sidewall part extending upward from the second plate-shaped part and defining a side surface of the second storage part; and
        a third plate-shaped part having a dimension along the horizontal plane and continuing to an upper end of the first sidewall part and an upper side of the second sidewall part.

4. The liquid amount detecting device as in claim 3, wherein
    a liquid amount which the first storage part is capable of storing is equal to a liquid amount which the second storage part is capable of storing, and
    a height of the first sidewall part is equal to a height of the second sidewall part.

5. The liquid amount detecting device as in claim 3, wherein
    the second detector further comprises a correction circuit configured to correct the integrated voltage value so as to output the second output voltage value that is proportional to a total liquid amount stored in the first storage part and the second storage part.

6. A liquid amount detecting device configured to detect a total liquid amount stored in a plurality of storage parts including a first storage part and a second storage part, the liquid amount detecting device comprising:
    a first detector disposed in the first storage part;
    a second detector disposed in the second storage part; and
    a connecting cable for connecting the first detector and the second detector,
wherein the first detector comprises:
    a first float;
    a first arm configured to convert a vertical movement of the first float to a rotational movement;
    a first magnetic sensor configured to generate a first analogue signal corresponding to the rotational movement of the first arm; and
    a first output terminal having one end of the connecting cable connected, and configured to output a first output voltage value corresponding to a voltage value indicated by the first analogue signal,
wherein the second detector comprises:
    a second float;
    a second arm configured to convert a vertical movement of the second float to a rotational movement;
    a second magnetic sensor configured to generate a second analogue signal corresponding to the rotational movement of the second arm;
    a reference terminal having the other end of the connecting cable connected; and
    a second output terminal configured to output a second output voltage value corresponding to an integrated voltage value in which a voltage value indicated by the second analogue signal and the first output voltage value inputted to the reference terminal are integrated, wherein:

the liquid amount detecting device is configured to:
output a minimum voltage value in a case where the total liquid amount stored in the plurality of storage parts is a minimum value; and
output a maximum voltage value in a case where the total liquid amount stored in the plurality of storage parts is a maximum value,
a maximum value of the first output voltage value is a value determined in accordance with the minimum voltage value, the maximum voltage value, and a predetermined liquid amount ratio, and
the predetermined liquid amount ratio is a ratio of a liquid amount which the first storage part is capable of storing and the total liquid amount which the plurality of storage parts is capable of storing.

* * * * *